Nov. 17, 1964  G. ALFIERI  3,157,413
LEVELING DEVICE FOR A PNEUMATIC SUSPENSION
Filed April 2, 1958  4 Sheets-Sheet 1

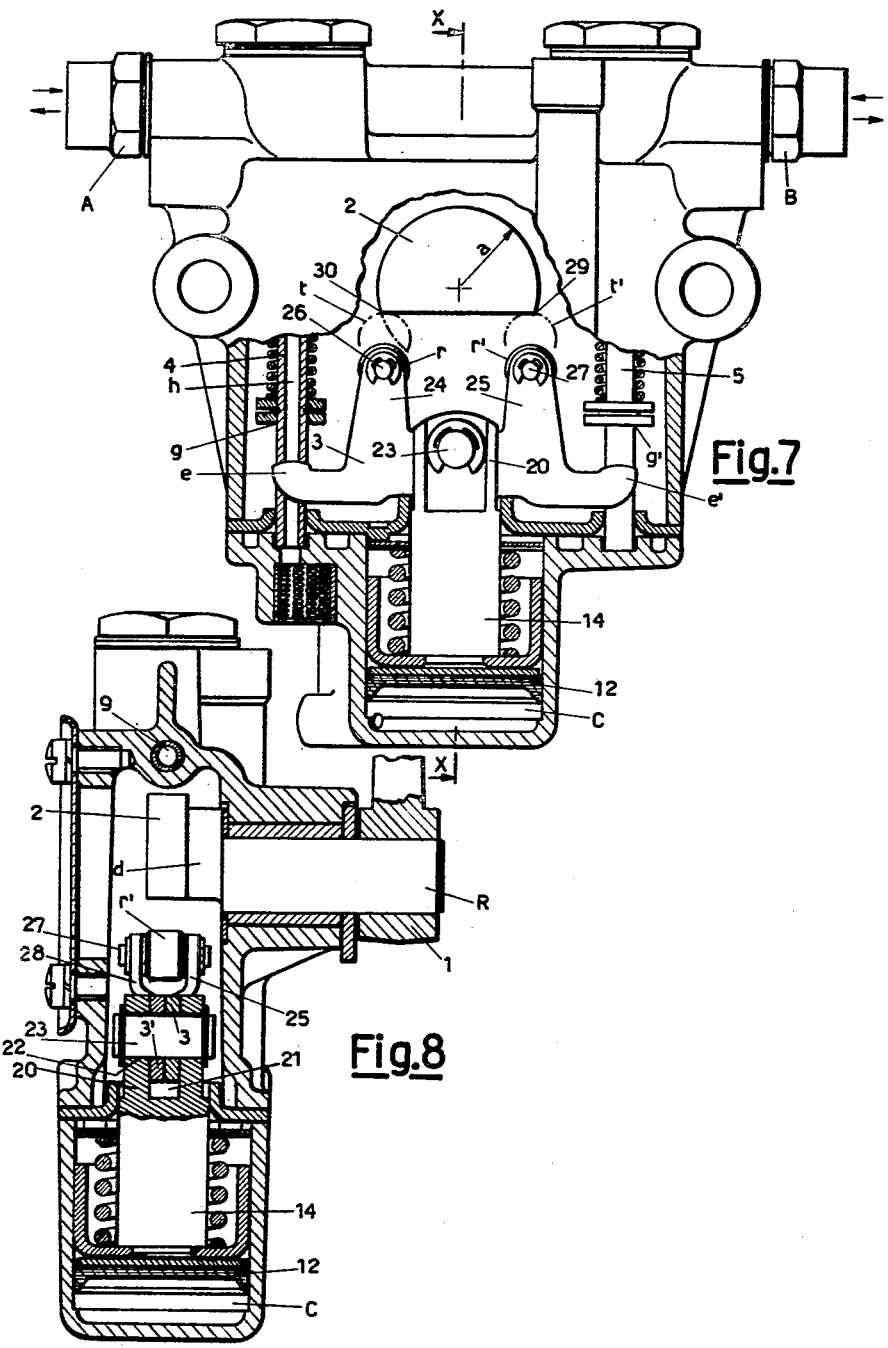

United States Patent Office 3,157,413
Patented Nov. 17, 1964

3,157,413
LEVELING DEVICE FOR A PNEUMATIC SUSPENSION
Giuseppe Alfieri, Milan, Italy, assignor to Fabbrica Italiana Magneti Marelli S.p.A., Milan, Italy, a company of Italy
Filed Apr. 2, 1958, Ser. No. 725,890
Claims priority, application Italy, Apr. 4, 1957, 569,787; July 20, 1957, 604,484
8 Claims. (Cl. 280—124)

The present invention relates to a levelling mechanism for pneumatic suspensions and more particularly to a device for adjusting pressure in elastic members, for instance bellows, interposed between the axle-wheel assembly and the frame of a vehicle.

As is known such levelling devices are mounted on the frame of the vehicle and are provided with a lever having an end connected to the axle-wheel assembly in such a way that every variation of load on the vehicle determines an angular stroke of the aforesaid lever. The lever causes actuation of the leveller which by feeding or discharging compressed air to or from the elastic elements respectively restores the initial conditions set for the level of the frame.

The actuation of the leveller is desired in cases of substantial variation of load on the frame; while it is undesirable in cases of instantaneous variation as may be due to recoil from irregularities of ground, from dynamic variations due to inertia in the accelerating or decelerating stages, etc.

The intervention of the leveller in those cases is normally limited by means of the adoption of compensating springs and of retarders of the hydraulic type, for example. This permits variations of instantaneous position of the control lever with corresponding delayed movements for the opening of an air inlet or outlet associated with elements of the suspension. It should be noted however that in conventional type levellers the entire assembly of the adjusting members is subject to unavoidable oscillations caused by road irregularities etc.

The device according to the present invention represents, therefore, a new more rational and very simple solution of the problem. The invention is characterized essentially in that it is possible to engage and to disengage the lever system terminated by an external lever with the lever system for the actuation and control of the pneumatic group (the means for the introduction and discharge of compressed air into and from the elastic elements of the transmission).

Figure 1:
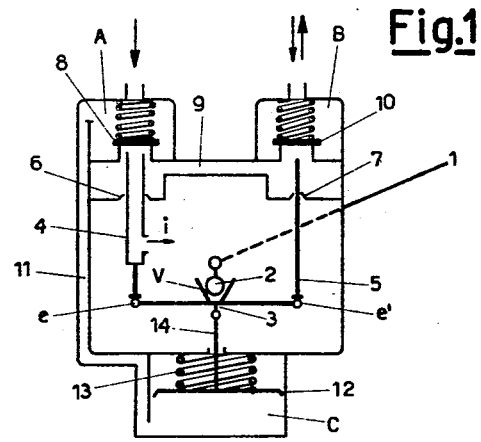
Figure 2:
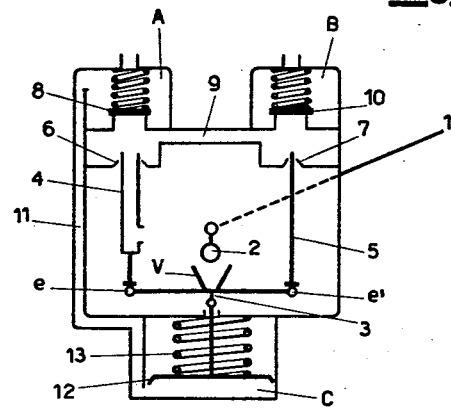

The invention will now be described and illustrated with reference to the accompanying drawings in which FIGURES 1 and 2 represent the functional diagrams of the device, respectively, in the engaging and rest stages, and FIGURES 3–4, 5–6 and 7–8 indicate in longitudinal and cross-sections respectively three preferred embodiments of the invention.

With reference to FIGURE 1, A and B indicate the chambers of the device connected respectively by direct conduits to the pneumatic source and to the elastic elements of the suspension, for instance bellows. C indicates the pressure chamber of the cylinder that controls the mechanical engaging or disengaging of the lever system to the external lever 1 with the actuating members of the device. A roller 2 is associated—through a rotary shaft—with the movement of the lever 1. During the operating conditions of the leveller, rollers are engaged either in the groove V or with another part of the rocker 3 whose ends e and e' act upon the tappets 4 and 5. 6 and 7 are the relative sealing gaskets of said tappets.

The tappet 4 has inside it a discharge conduit with an outlet hole i.

In the actuating stage, the two tappets 4 and 5 operate respectively upon the inlet valve 8 or upon the discharge valve 10, each provided with its own bias spring.

The conduit 9 connects chambers A and B via the valves 8 and 10. Under predetermined conditions conduit 9 is connected through the discharge conduit of the tappet 4 and the hole i, to the atmosphere. Compressed air will flow in the conduit 9 in the feeding stage of the elastic members as well as in the discharge stage.

Moreover, the chamber A is freely in communication with the pressure chamber C through the conduit 11. The compressed fluid from a supply source, not shown, flows into that chamber every time it is desired to actuate the levelling device or to prepare it to intervene and to compensate for any variation of load on the vehicle. In the engaging stage the pressure of the fluid in chamber C is exerted upon the piston 12 which is biased by the spring 13. By means of the rod 14 coupled to piston 12 the engagement between the roller 3 and the groove V or other part of the rocker 3 is maintained. This member is connected to the rod 14 by means of a hinge. FIGURE 2 shows the arrangement of the pneumatic control members when the chamber C is not under pressure. The rocker 3 in that condition, is not in contact with roller 2, the piston 12 being at end of a stroke.

Figure 3:
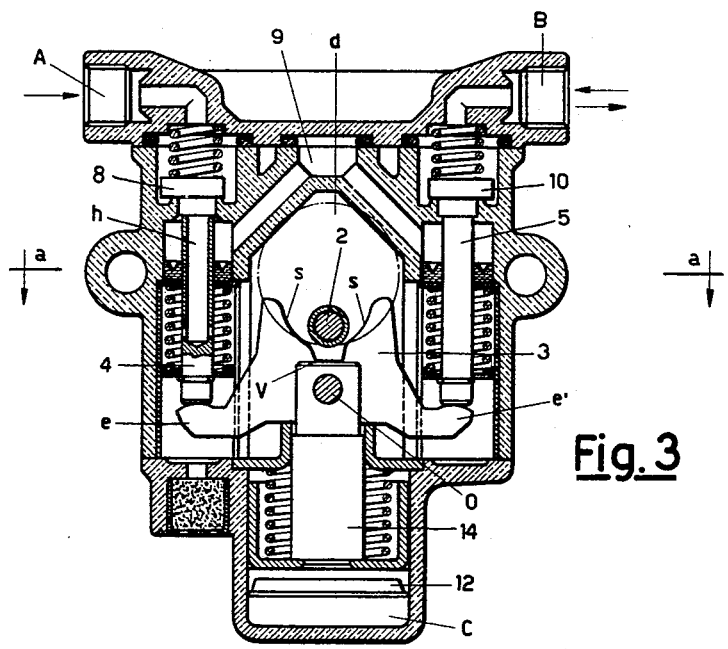
Figure 4:
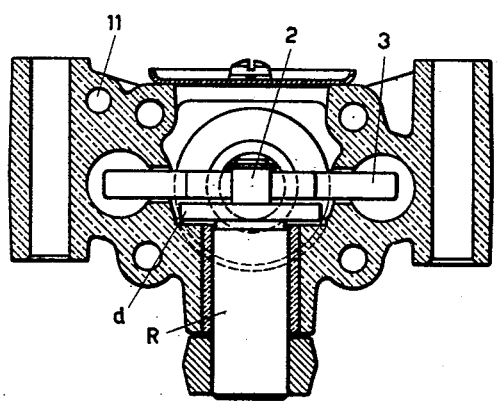

In FIGURES 3 and 4 which represent respectively in longitudinal and cross-section of one embodiment of the invention, the same elements and members as described in the diagram of FIGURES 1 and 2 are used. In particular, there is shown the chambers or connectors A and B connecting the source to the elastic elements of the suspension, the intercepting valves 8 and 10, the actuating tappet 4 with the discharge conduit h and the tappet 5, the pressure chamber C, the piston 12 with the stem 14 and the rocker 3 having ends e and e' and being provided with a groove V shaped with a particular profile s at the side of the cam 2. Rocker 3 is hinged at O to the stem 14 of piston 12.

The roller 2 is fixed eccentrically to the end disc d of the rotary shaft R which is controlled by the external lever. In FIGURE 4, which is a partial cross-section taken along the axis a—a, there is visible the shaft R carrying at its end the disc d whereon there is fixed the roller 2. To every stroke of the lever there corresponds a rotation of the shaft and, therefore, the displacement of the roller 2 which in the coupling stage engages in the groove V or part of the rocker 3 thereby causing its rotation, while it performs idle strokes when there is no coupling. In FIG. 4 there is shown the conduit 11 connected to the chamber C.

Figures 5, 6:
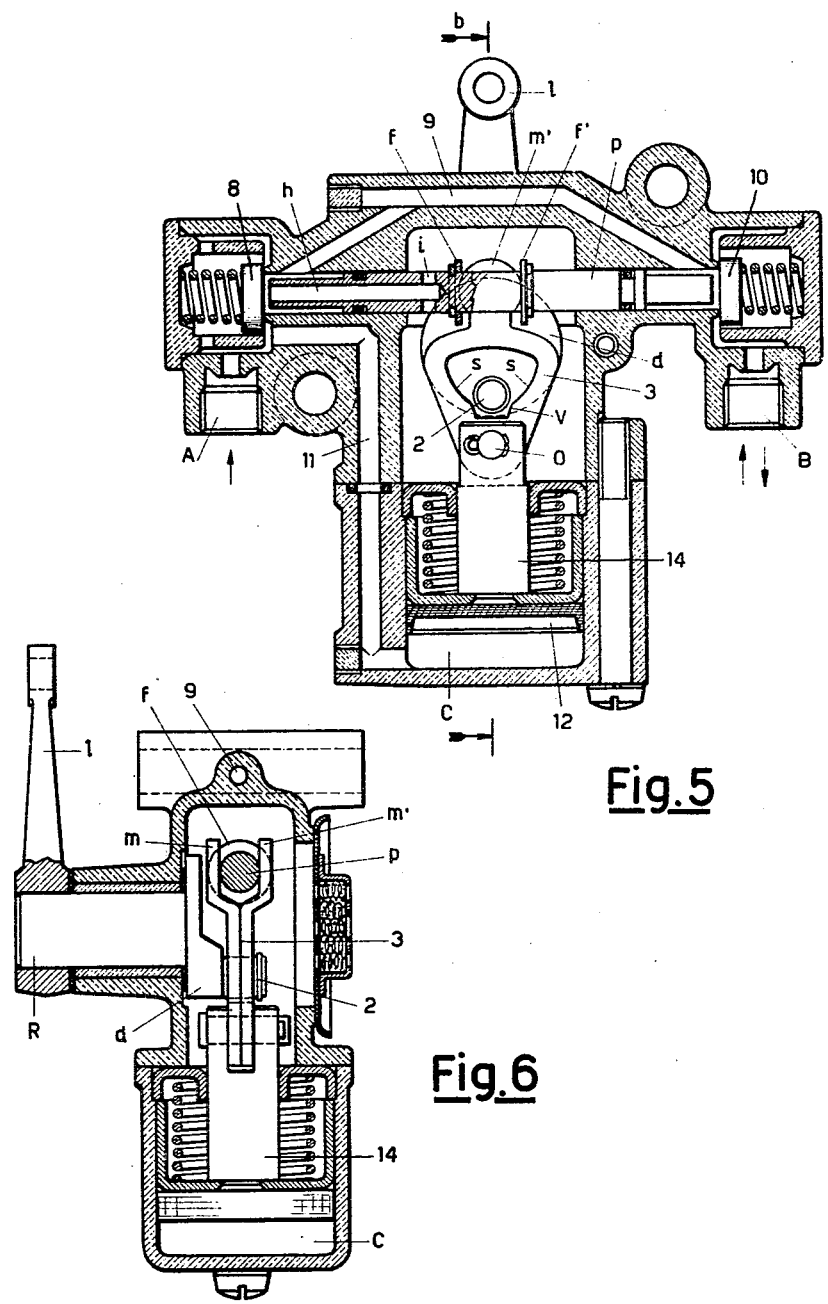

FIGURES 5 and 6 show another embodiment of the invention. The same reference letters and numerals are here used to indicate the elements already described in the preceding figures, namely the chambers A and B, the valves 8 and 10, the conduit 9, the chamber C fed through the conduit 9, the piston 12 and the rocker 3. Another characteristic of this second embodiment is in the coaxial arrangement of the two actuating sections.

The inlet valve 8 and the outlet valve 10 are coaxial, so that a single actuating tappet p may be used. This member is perforated at one side and is provided centrally with means for engaging with the rocker 3 which, to that end, has one end in the shape of a fork.

The engagement of the rocker 3 with the tappet p is obtained as indictaed in FIGURES 5 and 6 by means of the coupling guide f and f' of the tappet p and the extensions m and m' of the rocker 3. The other side of the rocker 3 is connected at O by means of a hinge, with the rod 14 of the piston 12.

The cam 2 eccentric with respect to the shaft R is fixed again to the disc d clearly visible in FIG. 6 which represents a cross-section taken along the axis b—b of the device according to the new embodiment.

During oscillation, the cam 2 can actuate the rocker 3 if there is engagement or it can oscillate freely if the members are disengaged.

To that end the rocker 3 has again a groove V followed by the profiles s.

Operation of the device according to the invention is as follows. If it is desired that the device should start operating, because for instance there are foreseen real load variations, the pneumatic piston 12 is actuated and, then the rocker 3 is engaged with the roller 2, thereby sending compressed air via the conduit 11 to the chamber C. To that end it will suffice to open a stop-cock (not shown) interposed in the conduit coming from the supply source connected at A.

If, on the other hand pressure is removed from the chamber C, the spring 13 causes the piston 12 to recede, with consequent disengagement of the rocker 3 from the roller 2.

In the active stage, following an increase of load, the cam 2 will cause the rotation (clockwise with reference to FIGURES 1-4), of the rocker 3, which causes via the corresponding tappet the opening of the inlet valve 8. Then the fluid will flow through said valve, the conduit 9, the valve 10 and the chamber B, to the elastic elements of the suspension.

In case of the diminution of load, the rocker 3 on the contrary will rotate in the opposite sense to cause through the opening of the valve 10 the discharge of the compressed air from the elastic elements through the conduits 9, h, and the hole i.

In the disengaged stage, as heretofore said, there is a disengagement of the mechanical connection between the actuating members controlled by the external lever and those of operation. Therefore, any rotations of the lever 1 do not cause the operation of the levelling device since any displacement of the control lever results in idle displacements of the eccentric roller 2.

The rocker 3 with the members connected thereto and in particular the tappets 4 and 5, remain in the rest position as indicated in the diagram of FIGURE 2.

In that way, in addition to the main object of not altering the pneumatic trim of the suspension because of seeming variations of load on the vehicle, there are attained the best conditions of the functionality and duration of the mechanism since the rocker and lever systems connected thereto, the tappets with the respective sealing gaskets, the valves and the other delicate members are not subject to useless movements involving wear.

The positions of engagement and disengagement of the leveller are obtained by means of a feeding cock or distributor which, at the operator's will, puts the chamber A and, therefore, the chamber C, in communication with the source of compressed air or with the atmosphere.

Said cock may be associated advantageously with the control of other devices. For instance on buses, it may be coupled with the control for opening of doors, by arranging to obtain engagement between the rocker and eccentric roller at the same time of the opening of the said doors when there is a possibility of load variations on the vehicle. Thus automatically the device returns to its disengaged position by closing said doors, after a real variation of load is no longer possible.

In FIGURES 7, 8, there is illustrated a further embodiment of the device, characterized in that the coupling between control lever and valve-actuating rocker is provided by a cam fitted on the rotary shaft controlled by a lever and by two rollers fulcrumed on two special extensions of a rocker. The rocker is controlled by the special auxiliary pneumatic device. As will be seen, an advantage is obtained by reducing the disengaging stroke of the rocker or by eliminating the making of a special profile of contact of said rocker.

With reference to FIGURE 7, A and B indicate again the connectors or chambers connected respectively to the supply source for the compressed fluid and to the elastic elements of the suspension (bellows). The same reference characters are employed where appropriate. The respective arrows indicate the sense of the fluid flow: for the direct connection to the lastic elements the double sense corresponds to the loading and unloading stages of the bellows; for the connection A however it corresponds to the feeding stage in one case and, in the other case, to the unloading of the only pneumatic engaging device. The reference numerals 4 and 5 indicate the tappets for actuating the valves of the two sections: the tappet 4 presents its internal hole h for discharge of the fluid coming from the elastic members. The pneumatic control device for the engagement of the rocker 3–3' comprises the piston 12 connected to the stem or fork 14. Piston 12 is represented in end-of-stroke position or disengaged position of the rocker. However, it will be understood that as soon as the chamber C is put under pressure, it is pushed upwards until determining the coupling of the members is effected. In FIGURE 8, the external lever 1 for actuating the rotary shaft R carries at its other end according to the invention, the roller or cam 2 through the disc d. As is shown in both FIGURE 7 and FIGURE 8 the forked stem 14 has a head 20 shaped in such a way as to enable easy and safe connection with the rocker 3–3'. In fact, said stem has in this part a milled portion 21 and normal thereto a hole 22. Milled portion 21 accommodates the rocker 3–3' which comprises two identical plates facing each other and at contact in correspondence with the central zone where each one has a hole. Through said hole and the holes 22 provided at the head of the forked stem 14, there is threaded the pin 23 which is free to permit the rotation of the rocker 3–3'. Rocker 3–3' comprises two identical small plates coupled symmetrically, that is, one rotated by 180° with respect to the other one. Each of said small plates has two ends, such as e–e' of the small plate 3, which are disposed almost at 90° with respect to two other extensions such as 24–25. The rocker 3 together with the extensions e, e' and extensions 24–25 form a single body. Extensions 24–25 have holes for threading thereinto the pins of rotation 26–27 about which the rollers r and r' rotate. It should be noted that the ends e–e' as well as the extensions such as 24–25 are coupled in spaced parallel relation to the analogous ends or extensions of the second small plate so as substantially to form a fork. In FIGURE 8 there are visible the extensions 25–28 of the small plates 3–3' which by means of the small shaft 27 support the roller r'. The roller r is supported by analogous extensions of which only one, 24, is visible in FIGURE 7. The rollers r and r' of course can easily rotate about their own pins 26–27 which are free with respect to the seats. Also the pairs of rocker ends are terminated by way of a fork and embrace without touching the actuating tappets 4–5 to selectively lift them during the rotation of said rocker. This is possible by virtue of the washers g and g' connected to the tappets 4 and 5. Corresponding ends of rocker 3–3' activate said tappets. Moreover, it should be noted that the particular embodiment of the rocker 3–3' can be fabricated from sheet metal, and therefore, not only meets the requirements of easy assembling, but also the condition of minimum cost. Moreover the two parts, particularly shaped, are obtainable by mere blanking. To be utilized, they need no further working as would be the case of a rocker made of one single piece, to bring it into the aforedescribed characteristic shape. The operation of the leveller in conditions of disengaged members (which case is indicated in the drawings 7 and 8) will now be described. Every displacement of the external lever 1 is rendered ineffectual by corresponding idle displacements or rotations of the shaft R and, therefore, of the cam 2. The trajectory described by the cam 2 in fact, is such as not to affect the rollers r–r' which are arranged at the centre of rotation of the cam 2 at a distance greater than the radius a of said cam. Hence it does not become necessary to make any particular profile of contact of the rocker 3–3', since this member is by no means involved with the disengaged stage. However, there is coupling of the cam 2 and rocker 3–3' when pressure is sent into the chamber C. The rollers $r$–$r'$ will consequently come to correspondence with the trajectories $t$–$t'$, that is, to contact cam 2 in order to cause the rotation of element 3 at the first displacement of the cam. It should be noted however that during the displacement in one sense or the other of the cam 2, only for a certain angle of rotation will there be a contemporaneous rotation of the rocker 3–3'. For the subsequent displacement of the cam 2, said member is kept in the position attained by the contact cam profile-actuated roller. In particular, the rocker 3–3' follows the rotation of the cam 2 until the point 30 (or 29) of the cam 2 starting from the position of FIGURE 7, detaches itself from the roller $r$ (or $r'$) upon which it exerted a thrust. From that time on, the rocker 3–3' does not rotate any longer but remains in the position of rotation attained, while the cam 2 will be able to continue rotating freely by a sufficiently wide angle depending on the stroke of the lever 1. Of the two actuating sections of the levelling device, the left one of FIG. 7 is actuated when there is an increase of load on the vehicle and the other one (right hand) when there is a diminution of load. In the first case, in fact, the tappet 4 opens the fluid-feeding valve towards the bellows; while in the second case the tappet 5 opens the fluid-discharge valve.

In operation: the rocker 3, forming together with the extensions $e$, $e'$ and the appendices 24 and 25 a single body, is brought to the position indicated in dotted lines by $t$ and $t'$ in the drawing.

In this position the arms $e$ and $e'$ contact the members $g$ and $g'$ respectively.

If the cam 2 is rotated counterclockwise, the rocker 3 will also rotate counterclockwise about 23 and, with the arm $e'$ acting on $g'$ will cause the opening of the valve 10 (FIG. 1) by means of the member 5.

The reverse operation will open the valve 8 by means of the member 4 displaced by the arm $e$ acting on $g$.

A main feature of the apparatus according to the invention is thus the adoption of the pneumatic operative member coupled with a member controlling the leveling valves and capable of swinging about a pivotal point which is movably carried by an extension of the piston, the rotation of said control member causing the actuation of either valve as it is displaced from its normal at rest position and engaged with the control lever connected to the outer lever, said engagement with the lever being obtained due to the feeding of the actuating element simultaneously with the actuation of the leveling device.

I claim:
1. A levelling device for use between the axle and the pneumatic suspension of a vehicle comprising a rocker, a control member adapted for rocking said rocker, a lever coupled between the axle and the control member, two actuating sections controllable by said rocker for controlling the pressure in elements of said pneumatic suspension, a mechanical coupling member supporting said rocker between said control member and said actuating sections and normally in a position whereat it is spaced from said control member, and a pneumatic element controllable by an operator for regulating the operation of said mechanical coupling to move said rocker to a position whereat it is engageable by said control member.

2. The apparatus of claim 1 wherein said pneumatic mechanism includes a piston having a rod hingeably connected to said rocker and a cylinder coupled to a source of pressure.

3. The apparatus of claim 1 wherein said control member includes a shaft coupled to said lever, a disc disposed on one end of said shaft and roller eccentrically disposed on said disc for engaging said rocker.

4. The apparatus of claim 1 wherein said rocker has two actuating arms for respectively engaging said actuating sections.

5. The apparatus of claim 1 wherein said actuating sections are coaxially disposed and said rocker has one actuating arm intermediate said actuating sections.

6. The apparatus of claim 1 wherein said control member includes a shaft and a cam disposed on said shaft, and said rocker includes two extensions for fulcrumly supporting rollers that are engageable by said cam.

7. The apparatus of claim 6 wherein said pneumatic element includes a chamber coupled to a source of pressure and a piston having a fork-shaped stem, and said rocker includes a pair of symmetrical plates that are fulcrumed by said fork-shaped stem.

8. The apparatus of claim 7 wherein said actuating sections include tappets and said plates have extensions for engaging said tappets when said control member is operated.

References Cited in the file of this patent
UNITED STATES PATENTS

| | | |
|---|---|---|
| 1,816,075 | Down | July 28, 1931 |
| 2,820,647 | Jackson | Jan. 21, 1958 |
| 2,923,557 | Schilling | Feb. 2, 1960 |
| 3,099,461 | Stelzer | July 30, 1963 |